June 9, 1936.  H. J. MURRAY  2,043,806
SYNCHRONIZING DEVICE FOR AUTOMOTIVE VEHICLES
Filed Jan. 12, 1933  2 Sheets-Sheet 1

INVENTOR
HOWARD J. MURRAY
BY
Warren S. Orton
ATTORNEY

June 9, 1936.  H. J. MURRAY  2,043,806
SYNCHRONIZING DEVICE FOR AUTOMOTIVE VEHICLES
Filed Jan. 12, 1933  2 Sheets-Sheet 2
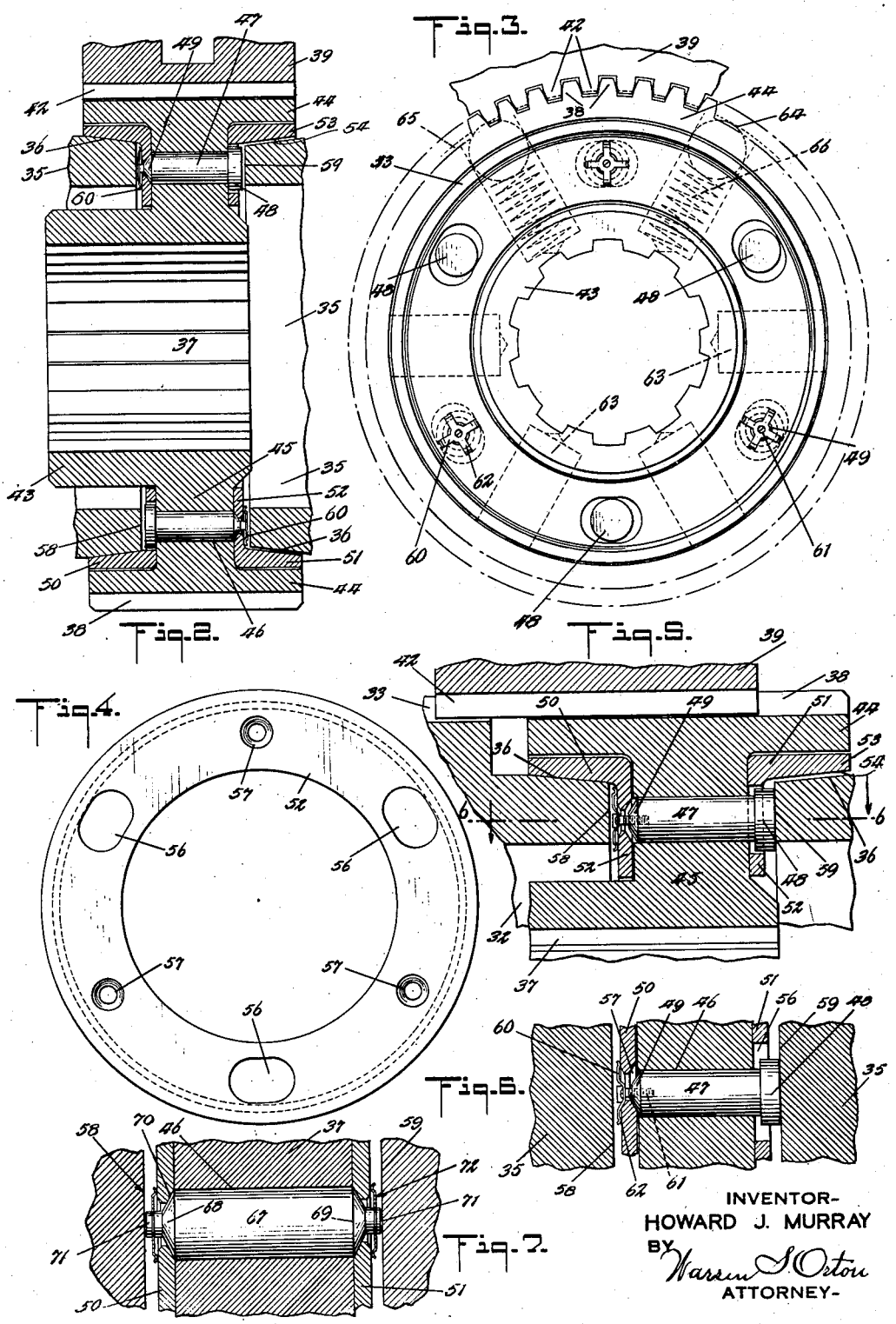
INVENTOR-
HOWARD J. MURRAY
BY
ATTORNEY- Patented June 9, 1936

2,043,806

UNITED STATES PATENT OFFICE 2,043,806

SYNCHRONIZING DEVICE FOR AUTOMOTIVE VEHICLES

Howard J. Murray, New York, N. Y., assignor, by mesne assignments, to Borg-Warner Corporation, Chicago, Ill., a corporation of Illinois Application January 12, 1933, Serial No. 651,315

36 Claims. (Cl. 192—53)

The invention relates to a synchronizing device for synchronizing the speeds of clutches, gears and the like, before they are moved into intergeared or interclutching relation and the invention specifically relates to that type of positive clutch device in which a synchronizing device including a friction clutch drive is established between the positive clutch elements to cause one to approach the speed of the other as one is moved towards its positive clutch connection with the other.

The present disclosure constitutes a further development of the inventions defined in my several copending applications Serial Nos. 50,279, 614,502, 331,944 and Patent No. 1,924,875, August 29, 1933, among other respects in that the operating force which causes the interposed friction clutch to become effective originates from the force which is inherent in the positive clutch elements in their relative rotative tendency to pass each other. The present invention like that disclosed in these prior applications also features the utilization of a light-weight, combined floating friction clutch element and camming ring, and in this respect also features the utilization of a shrouded type of synchronizer of the type disclosed in my Patent No. 1,924,875.

The primary object of the present invention is to provide a simplified form of self-energized synchronizer particularly designed for installation in a known form of change speed transmission mechanism in an automotive vehicle power plant.

Various other objects and advantages of the invention will be in part obvious from an inspection of the accompanying drawings, and in part will be more fully set forth in the particular description of one form of mechanism embodying the invention, and the invention also consists in certain new and novel features of construction and combination of parts hereinafter set forth and claimed.

In the accompanying drawings:

Fig. 2 is an enlarged axial sectional view of the synchronizing device demounted from its carrying shaft shown in Fig. 1 with some of the parts broken away, and showing the relation of the parts at the instant the friction clutch elements have engaged and before the cam has functioned to increase the intensity of the clutching engagement;

Fig. 3 is a view in end elevation of part of the mechanism shown in Fig. 2;

Fig. 4 is a view of the reverse side of the combined camming and friction clutch ring from that shown in Fig. 3;

Fig. 5 is a view corresponding to that shown in the upper part of Fig. 2 in the next succeeding position with the left friction clutch engaged with the camming pin shifted and showing the positive clutch elements engaged;

Fig. 6 is a detail transverse sectional view taken on the line 6—6 of Fig. 5; and Fig. 7 is a showing of a modified form of camming pin and with the parts in their normal unclutched position as shown in Figs. 1, 2, and 3.

Figure 1:
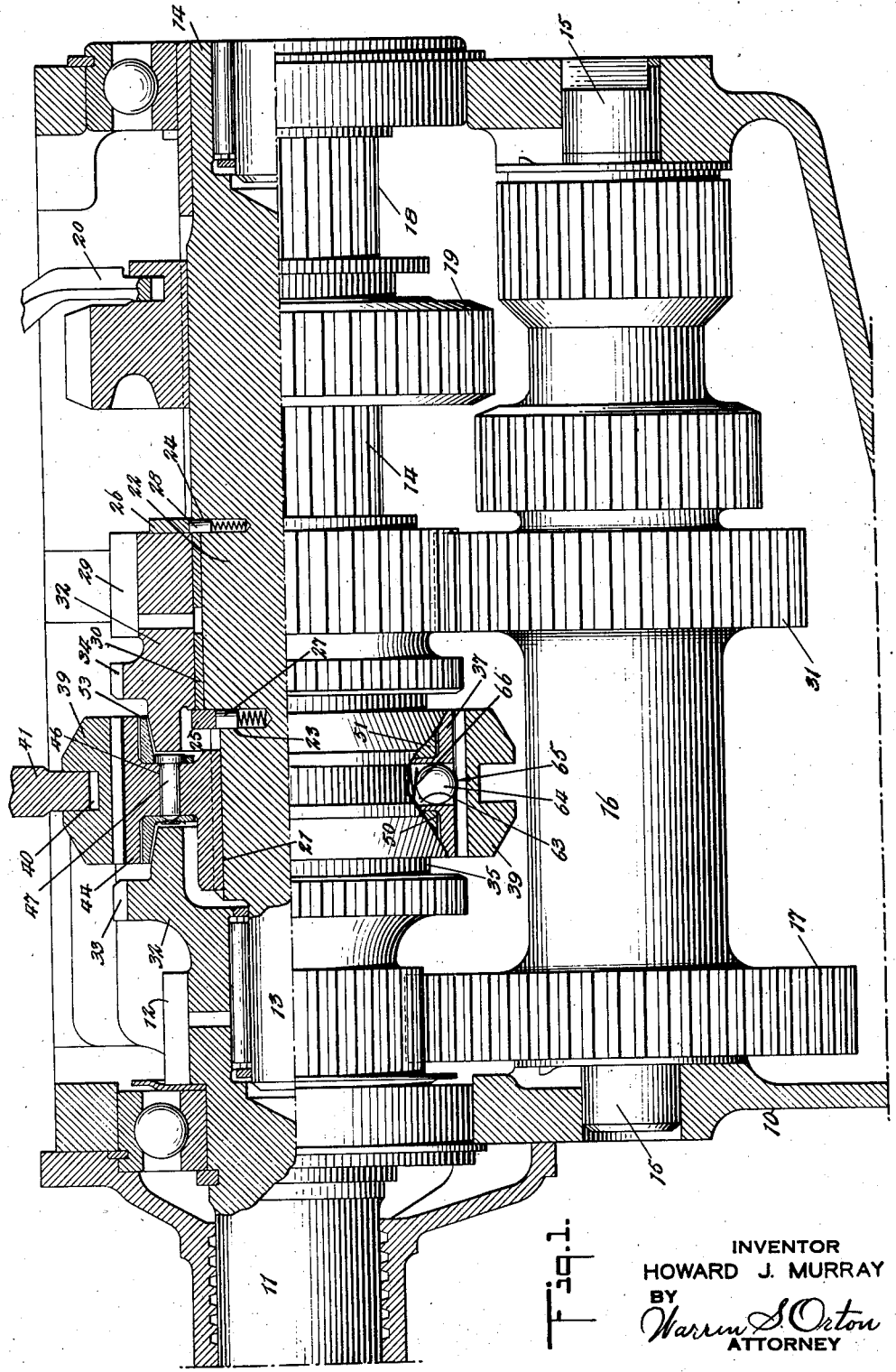
Fig. 1 is a view partly in elevation and partly in a vertical section taken axially of the main power shafts in a change speed transmission of conventional form, showing a preferred embodiment of the invention installed therein to effect synchronization of the direct and second speed drives and with the several parts of the synchronizing device shown in their neutral inoperative position.

In the drawings there are shown an automobile transmission of the constant mesh gear type including a mechanism containing casing 10 into one end of which is intruded an engine shaft 11 provided at the end intruded into the casing with an engine gear 12. The reduced smooth end 13 of a propeller shaft 14 connected to drive the traction wheels of the vehicle as is usual in such constructions is journalled in the inner end of gear 12. There is also disclosed the usual jack shaft 15 with its cluster of jack shaft gears 16 driven from the engine shaft 11 through the end gear 17 of the cluster in constant mesh with the engine gear 12. The shaft 14 is provided with an unreduced spline portion 18 carrying gear 19 keyed thereto and slidable thereon by means of the fork 20 to provide the usual low and reverse drives, without any synchronizing features.

Between the unreduced splined portion 18 and the reduced smooth journalled end portion 13 the shaft is twice reduced; the lowest reduction adjacent the end 13 provided with splines 21 and the other reduced portion 22 being smooth and provided at opposite ends with grooves 23 and 24 in which are mounted respectively stop rings 25 and 26 held in place by spring pressed plungers 27 and 28. A power gear 29 is rotatably mounted on the smooth portion 22 of the shaft, is held from end play by the stop rings 25 and 26, is provided with antifriction bearings 30 and is in constant mesh with gear 31 of the cluster 16 on the jack shaft. From this construction it is obvious that gear 29 is supported on the propeller shaft and like the engine gear 12 is turning at all times with the engine shaft and is fixed against axial movement.

The adjacent ends of gears 12 and 29 are slightly spaced apart and are of similar form except that they are reversed in position and in each case includes an axially extending ring 32 provided with spur gear teeth, with teeth 33 projecting outwardly from ring 32 of gear 12 and teeth 34 similarly projecting from gear 29 and having the same pitch diameter. Each of these sets of teeth will hereinafter sometimes be referred to as elements of a positive clutch drive.

Projecting towards each other from each of the rings 32 provided with the teeth 33 and 34 is an extension in the form of a ring 35 spaced from the shaft 14, the outer perimeter of which ring is slightly beveled to form a conical surface 36 hereinafter sometimes referred to as an axially fixed friction clutch element.

The portion of the shaft 14 which is located between the hub portions of the gears 12 and 29 and which is provided with the splines 21 has keyed thereto a slide unit which is keyed to and thus turns with the shaft 14 and is capable of a slight freedom of axial movement from the neutral position shown in Fig. 1 to the left to effect a frictional clutching engagement with gear 12 or to the right into similar friction clutching engagement with the gear 29 as hereinafter described. The slide unit includes two telescoped parts, an inner spool-like mounting member 37 and an outer slide member 39. The mounting member 37 is of wide gear-like form provided at its outer periphery with a line of teeth 38 forming an internal drive with a ring-like slide member 39 encircling the same and capable of sliding axially thereon towards either set of the gear teeth 33 or 34. The slide member is provided on its outer periphery with an annular slot 40 in which is contained a yoke fork 41 in turn operatively connected to be shifted by the usual hand lever as is well known in automobile transmission mechanisms. The slide member is provided on its inner periphery with internal spur gear teeth 42 constantly in mesh with teeth 38.

The mounting member 37 includes a relatively long hub 43 with a relatively long engagement with the splined shaft and telescopes within the left ring 35 forming the extension from gear 12. The mounting member also includes a relatively long outer rim 44 encircling both of the rings 35 and is provided with the teeth 38 defining its outer perimeter. Between the hub 43 and the rim 44 is a rugged connecting web 45 provided with a plurality, in this case with six axially extending and equidistantly spaced apart apertures 46, in each of which is mounted a bolt-like pin 47. Each pin is provided at one end with a stop head 48 and at the opposite end with a blunt conical or frusto-conical nose 49 projecting in each case outwardly beyond the adjacent side of the web 45. The pins are arranged in alternately reversed positions with a headed end of one pin on one side of the web being positioned between the pointed end of the next two adjacent pins, so that there will be projecting from one side of the web 45 three pointed ends of pins spaced 120° apart and with three headed ends of the pins similarly spaced apart as particularly shown in Fig. 3.

Positioned on opposite sides of the web 45 is a synchronizer in the form of a combined dish-like camming and clutch ring with the one on the left, 50, positioned between the web of the mounting member and the gear 12, and the one on the right, 51, similarly positioned between the web of the mounting member 37 and the gear 29. In each case the ring includes a flat annular thin cam plate 52 normally snugly engaging one side of the web 45 and positioned radially between the hub 43 and the rim 44. The ring also includes an axially extending rim or outer band 53 telescoping the ring 35 and having its inner periphery beveled as shown at 54 to coact with the adjacent axially fixed friction clutch element 36. The beveled rim 53 will be hereinafter sometimes referred to as the shiftable or floating friction clutch element. The rim 53 in all cases is located within the adjacent end of the encircling gear-like rim 44 so that the rim 44 forms a shroud to protect the floating friction clutch element as is more fully described in my Patent No. 1,924,875.

Each plate 52 is provided with six equally spaced recesses or apertures with alternate three apertures 56 slightly elongated circumferentially and of sufficient length to contain the heads 48 of the pins with some clearance to permit a slight rotary shifting of the cam plate 52 relative to the mounting member 37 without interference from the heads. The other three apertures or recesses 57 are of conical or frusto-conical form and designed to have the similarly shaped ends of the pins fit therein and with the parts otherwise so constructed and organized that any tendency of the ring 50 or 51 to rotate relative to the mounting member 37 will cause the cam forming ends of the pins to react against the coacting cam forming sides of the recesses to shift the shiftable friction clutch elements axially and into friction clutching engagement with their companions. The advance faces 58 and 59 of the rings 35 from each of the gears 12 and 29 are in axial alignment with the camming pins and provide in each instance a stop face against which the headed ends of the pins engage when the mounting member is moved and the pins react in a direction to cause this engagement. The parts are so proportioned that when the mounting member is moved in one direction, such for instance as towards the left in Fig. 1, the heads on the right side will engage the stop face provided by the ring extension from gear 29 as shown in Figs. 5 and 6 and act as a stop to the further advance of the pins and in this way the pointed ends of the pins are held axially while the sliding friction clutch element is permitted its relative rotary movement as shown in Figs. 5 and 6. Similarly when the right friction clutch 51—36 becomes operative the coacting pins have their headed ends shifting to the left and into engagement with the stop face 58.

The pointed ends of the camming pins 47 are provided with reseating springs 60 (see Fig. 3) in the form of four-prong spiders secured centrally to the pins by means of screws 61. The ends of the prongs of the springs bear on the outer side of the cam plate 52 and tend normally to shift its associated pin axially, to remove the head 48 from the adjacent stop face and to react on the cam ring to re-rotate it back into its normal non-clutching position with the pointed ends of the pins centered in their respective sockets or recesses 57.

The mounting member 37 is provided midlength of its outer toothed surface with six spaced slip connections 63 with the normally shiftable slide member 39. The connections are located circumferentially between the camming pins as shown in dotted outline in Fig. 3. Each connection includes a spherical detent 64 having its outer surface extending slightly from the mounting member and projecting into a shallow groove 65 formed on the inner toothed surface of the slide member. A backing spring 66 acts on the detent normally to maintain it in the groove as shown in Fig. 1.

In the modified showing of the camming pin 67 in Fig. 7 the heads are omitted and both ends are pointed with frusto-conical camming portions 68 and 69 engaging in apertures 70 all of which are of the circular socket form shown at 57 in the preceeding figures. The pins 67 are each provided at opposite ends with an axially extending shaft-like button 71 which functions in their engagement with the stop faces 58 and 59 as do the heads 48 previously described. Each button is provided with a flat reseating spring 72 which bears on the adjacent part of the shiftable clutch element and coacts to center the pins 67 as previously described for the pins 47.

In operation and assuming that the parts are in the neutral position shown in Fig. 1, and that it is desired to synchronize the engine and propeller shafts prior to causing the shafts to be connected with each other directly or at high speed, shift fork 41 is in this case moved to the left carrying with it the slide unit including the slide member 39, the mounting member 37 through the interposed slip clutch connections together with the two synchronizers 50 and 51 and their associated camming devices 47. It is assumed that the shafts 11 and 14 are turning at different speeds and therefore the slide unit and gear 12 are turning at different speeds. Under shifting pressure from the fork 41, the shift member 39, the mounting member 37 and both of the shiftable friction clutch elements 50 and 51 will be moved bodily to the left from the neutral position shown in Fig. 1 until the left friction clutch element 50 contacts with its companion 36 at which time the parts will be in the position shown in Fig. 2. The mounting member 37 will thus be held from further axial advance to the left but the slide member 39 will be free to depress the spherical detents 64 and continue its advance under the action of the shift fork as will hereinafter be more fully described. With the friction clutch elements thus engaged even lightly, the friction clutch as a whole will tend to rotate with the gear 12 and its associated engine driven parts. Any tendency of the clutch ring 50 to move relative to its mounting member 37 will cause the camming connection 49—57 to react with a force dependent upon the difference of momentum between gear 12 and the parts associated therewith and the mounting member 37 and the vehicle parts associated therewith.

It will be understood that as the ring 50 tends to move past the pointed ends of the camming pins 47 the inclined sides of the recesses 57 bear on the inclined sides of the pointed pin ends and the first effect will be to shift the pins axially until the heads thereof engage the stop faces 59. This axial shifting of the pins will distort and thus place their reseating springs 60 under tension and at which time the camming pin, cam plate and spring are in the position shown in Figs. 5 and 6. With the pins thus held from further retreat by means of the stop face 59 the pointed ends 49 become fixed relative to a transverse plane through the same and any further relative rotary movement of the friction clutch ring 50 relative to the pins so held will cause the friction clutch member in effect to attempt to move past the cam forming ends of the pins and thus tend to shift the member 50 ino a more intense clutching engagement with the conical friction surface 36. The greater the difference in momentum between the shafts 11 and 14 the greater will be the frictional clutching engagement therebetween provided by the clutch 50—36 and the quicker will shafts 11 and 14 be brought to the same speed.

The continued movement of the shift fork 41 will cause the shift member 39 to move beyond the position which it assumes when the friction clutch became operative as shown in Fig. 2 and this manually shiftable movement of member 39 is continued until the teeth 42 thereof are in meshing engagement telescoping the teeth 33 of the gear 12 as shown in Fig. 5 and there is thus eventually provided a positive drive connection from shaft 11 through gear 12, teeth 33, teeth 42, teeth 38, mounting member 37, splines 21 to the propeller shaft 14.

In this way there is provided eventually a positive drive between the shafts 11 and 14 and which has been attained simply by shifting the manual lever controlling the shift fork 41 in the conventional manner to attain the desired gear combination.

As soon as axially directed tension is removed from the mounting member 37, springs 60 will tend to restore the camming pins 47 to their initial position. As the springs 60 bear on the cam plate 52 as noted in Fig. 6, the combined action of the three engagements between the pointed ends of the pins and the plate 52 will be a tendency for the plate to be re-rotated so as to bring the pointed ends 49 of the pins centered in their respective sockets 57 and the floating friction clutch element is thus eventually restored to its normal position as shown in Fig. 2. Then the pins 47 will in effect be shifted from the position shown in Figs. 5-6 to the left and this will remove heads 48 from the stop face 59.

In a subsequent unclutching movement the shift fork 41 is moved to the right from the position of the parts shown in Fig. 5 and eventually the groove 65 will be moved into alignment with the detents 64 at which time the slip connections are re-established and the final shifting movement into neutral position shown in Fig. 1 will move the slide unit as a whole to the right and back into the neutral position shown in Fig. 1.

Should it so happen that for any reason the pins 47 or any one of them should be stuck in the position shown in Figs. 5 and 6 the movement of the shift member back to its neutral position will automatically shift the pins back to their normal position shown in Fig. 1 with an incidental resetting of the friction clutch element 50. This replacing of parts as the shift fork 41 moves into its neutral position is caused by the shift fork acting on the slide member 39 and therethrough on the mounting member. Shifting the mounting member to the right from the position shown in Fig. 5 with the pin head 48 still in engagement with its stop 59 will, of course, loosen the pin from the mounting member and in effect restore the pointed end 49 into its position seated in the aperture 57 which action will tend to re-rotate the ring 50 and thus tend to loosen the same from any accidental sticking engagement between the friction clutch surfaces at 36—53. In any case the spring 60 is active in its tendency to move the shiftable friction clutch element into its normal inoperative unclutched position. From this construction it is seen that the synchronizing friction clutch after having been actuated is automatically reset into inoperative position as an incident of restoring the control mechanism to its neutral position. The synchronizing devices are rendered inoperative whenever the gear set control passes through its neutral position. In this way it is impossible to cause two synchronizing devices to function at the same time.

It is apparent from this description that a similar frictional clutching engagement can be effected between the gear 29 and the shaft 14 to effect a synchronization of the gears which form the "second" or intermediate gear combination. This is effected as an incident of moving the control in the usual direction to attain intermediate as by moving the shift fork 41 in a direction from left to right from the position shown in Fig. 1. Similarly in this case there will be an initial clutching engagement between the synchronizer ring 51 and its companion 36 at the right, followed by a camming of the ring 51 into a more intense clutching condition by the reaction between the ring 51 and the right hand pointed ends of the three coacting pins 47, all in the same manner as has been described for the frictional clutch at the left of the showing in Fig. 1, and eventually the teeth 42 on the right hand side of the shift member 39 are moved into positive clutching engagement with the teeth 34 to thus establish a driving connection from the spline shaft 14, through the mounting member 37, through the slide member 39, gear teeth 34, to turn gear 29 and therefrom to turn the engine shaft 11 through the gear train formed by the gears 31, 17, and 12. After the parts have thus been moved into their final driving position, the main clutch is reengaged and power is then taken from the engine shaft 11 and the drive is then through gears 12, 17, 31, 29, teeth 34, slide member 39 and mounting member 37 to shaft 14.

From this construction it is apparent that by means of the single control 41 it is possible to inaugurate a self-energized friction clutching engagement selectively between the engine shaft 11 and the propeller shaft 14 at two different speeds depending upon the direction of movement of the control member and eventually to establish a positive driving relation at the selected speed between the shafts simply by a continuation of the control member movement in the selected direction.

In the form of the camming arrangement shown in Fig. 7 it is possible to form the camming pins as double acting members and in this way all six pins may be utilized to control each of the camming plates 52 and all twelve reseating springs 72 can be utilized to insure the reseating of these pins in their associated camming apertures 70 as previously described for the pointed ends of pins 47 in their engagement with their associated apertures 57.

It is noted that the clearances between the buttons 71 and the adjacent stop faces 58 and 59 are extremely slight so as to minimize the axial movement of pins 67. Accordingly, the degree of flexing of the springs 72 is limited and is caused by the rotary shifting of the members 59 and 51.

I claim:

1. In a device of the class described, the combination of a spline shaft, two power members mounted in axially spaced apart relation for rotary movement about the axis of the shaft and otherwise fixed against axial movement, each member provided with a stop face, one facing the other and each provided with an element of a positive clutch drive and with an element of a friction clutch drive, a mounting member keyed to the shaft to turn therewith, located between the power members and having a limited axial sliding movement relative to both power members, a pair of combined camming and clutch rings positioned on opposite sides of the mounting member and each provided with an element of a friction clutch drive coacting with the adjacent friction clutch element on the power members to form a friction clutch drive between the shaft and each of the power members, each of the rings provided with an axially extending recess of frusto-conical form, two bolt-like camming pins slidably mounted for axial movement in the mounting member, and each provided with a conical end, with the conical end of one pin fitting in the recess of one of the rings and the conical end of the other pin similarly fitting in the recess in the other ring, and said pin and ring each coacting to move the ring axially into frictional clutching engagement with its associated friction clutch element on relative rotary movement of the ring and mounting member, the ends opposite the conical ends of each pin adapted to be shifted by such relative movement into abutment with the stop face of the adjacent power member, resilient means acting on the pins and tending normally to maintain them in position spaced from the stop faces, a slide member keyed to the mounting member to turn therewith and having a limited axial movement thereon from a neutral position towards either of the power members and provided with elements of a positive clutch drive to engage selectively with the positive elements of one or the other power members to provide a positive drive between the shaft and which ever one of the power members are engaged by the slide member, a slip connection between the slide member and the mounting member for shifting the mounting member with the slide member to bring the friction clutch on the advancing side into operation and a shift fork engaging the slide member for successively causing the friction clutch and then the positive clutch on one or the other side to become effective depending on the direction of movement of the shift fork.

2. In a device of the class described, the combination of a spline shaft, two power members mounted in axially spaced apart relation for rotary movement about the axis of the shaft and otherwise fixed against axial movement, each member provided with a stop face, one facing the other and each provided with an element of a positive clutch drive and with an element of a friction clutch drive, a mounting member keyed to the shaft to turn therewith, located between the power members and having a limited axial sliding movement relative to both power members, a pair of combined camming and clutch rings positioned on opposite sides of the mounting member and each provided with an element of a friction clutch drive coacting with the adjacent friction clutch element on the power members to form a friction clutch drive between the shaft and each of the power members, each of the rings provided with an axially extending recess of frusto-conical form, two bolt-like camming pins slidably mounted for axial movement in the mounting member, and each provided with a conical end, with the conical end of one pin fitting in the recess of one of the rings and the conical end of the other pin similarly fitting in the recess in the other ring, and said pin and ring each coacting to move the ring axially into frictional clutching engagement with its associated friction clutch element on relative rotary movement of the ring and mounting member, the ends opposite the conical ends of each pin adapted to be shifted by such relative movement into abutment with the stop face of the adjacent power member, a slide member keyed to the mounting member to turn therewith and having a limited axial movement thereon from a neutral position towards either of the power members and provided with elements of a positive clutch drive to engage selectively with the positive elements of one or the other power members to provide a positive drive between the shaft and which ever one of the power members are engaged by the slide member, a slip connection between the slide member and the mounting member for shifting the mounting member with the slide member to bring the friction clutch on the advancing side into operation and a shift fork engaging the slide member for successively causing the friction clutch and then the positive clutch on one or the other side to become effective depending on the direction of movement of the shift fork.

3. In a device of the class described, the combination of a power gear having clutch teeth and provided with a ring-like extension having a periphery beveled to form an axially fixed frustoconical friction clutch element, a shaft having a splined portion telescoped by said extension, a spool like mounting member having a long hub keyed to said splined portion and slidable axially thereon, said mounting member including an outer rim telescoping the extension and provided on its outer periphery with gear-like teeth, a coacting friction clutch element carried by the mounting member having a limited freedom of rotary movement thereon and shrouded by its outer rim, said element provided with a cam receiving opening, an annular slide member encircling the mounting member and provided on its inner periphery with teeth constantly in mesh with the teeth of the mounting member and adapted to engage the teeth of the power gear to provide a positive drive connection therewith, a slip connection between the slide member and mounting member for shifting the coacting friction clutch element into an initial engagement with its companion and camming means operatively responsive to relative rotary movement between the coacting friction clutch element and the mounting member and engaging in the opening in the coacting friction clutch element for intensifying the initial friction engagement of the elements.

4. In a device of the class described, the combination of a shaft, and a power gear having a common axis of rotation, said power gear provided with a line of gear-like teeth and an axially fixed element of a conical friction clutch, an assembly of parts turning with the shaft and including two telescoped intermeshed members with the inner member keyed to the shaft, and the outer member provided internally with teeth meshing with the inner member and adapted to be shifted into telescoping meshing engagement with the gear-like teeth on the power member to provide a positive drive between the power member and the shaft, a slip connection between the two intermeshed members for sliding one with the other as a single unit, an axially shiftable coacting friction clutch element carried by the inner member having a limited freedom of rotary movement relative thereto, camming means carried by the inner member, axially shiftable relative thereto and operatively responsive to a tendency of the friction clutch element to move relative to the inner member for causing the shiftable friction clutch element to bear on its associated axially fixed element and control means engaging the outer member and acting to shift the same to cause in sequence an engagement of the friction clutch, an actuation of the camming means to cause the friction clutch to become operative and thus tend to bring the gear and shaft to the same speed and finally to cause the outer member to be moved into its meshing engagement with the power gear.

5. In a device of the class described, the combination of a spline shaft, a power member mounted for rotary movement about the axis of the shaft, otherwise fixed against axial movement and provided with an element of a positive clutch and an element of a friction clutch, a mounting member keyed to the shaft to turn therewith and slidable axially thereon, a combined camming and clutch ring carried by the mounting member turning and sliding therewith and capable of slight relative rotary movement relative thereto, and provided with a coacting element of the friction clutch, and with a cam element, a camming member carried by the mounting member and provided with means coacting with the cam element on the ring and acting by virtue of said slight relative rotary movement when the mounting member has moved the clutch ring into engagement with its companion to force the coacting clutch element axially into engagement with its companion, a slide member keyed to the mounting member to turn therewith and with the shaft and provided with a coacting element of the positive clutch and a slip connection between the slide member and the mounting member.

6. In a device of the class described, the combination of a spline shaft, a power member provided with an element of a positive clutch and an element of a friction clutch, a mounting member keyed to the shaft to turn therewith, a coacting friction clutch element carried by the mounting member to turn therewith and capable of slight rotary movement relative thereto, said coacting friction clutch element provided with an opening extending therethrough, camming means engaging in said opening and acting between the coacting friction element and the mounting member incidental to said slight relative movement for shifting the coacting friction element into firm clutching engagement with its companion, a slide member turning with the mounting member provided with the coacting element of the positive clutch and means between the slide member and mounting member for shifting the mounting member with the shifting of the slide member until the friction clutch becomes operative and thereafter permitting the slide member to move beyond the shifted position of the mounting member to bring the positive clutch elements into interdriving relation.

7. In a device of the class described, the combination of a power member mounted for rotary movement and otherwise fixed axially, said power member provided with an element of a friction clutch and an element of a positive clutch, a group of parts mounted for rotary movement about the axis of the power member and each part movable axially relative to every other part of the group and relative to the power member, one of said parts constituting a spool-like mounting member provided with a long hub keyed to the shaft, an outer rim and a web connecting the hub and rim, another part carried by the mounting member and fitted between the hub and rim on one side of the web, constituting the coacting element of the friction clutch and another part splined to the rim constituting the coacting element of the positive clutch, means for shifting the coacting positive clutch element axially relative to the mounting member and into engagement with its companion on the power member, camming means between the web and the coacting element of the friction clutch for increasing its clutching action beyond its initial clutching action, and control means engaging said last named part for shifting the mounting member and with it the coacting friction clutch into its initial engagement with its companion and for shifting the positive element into engagement with its companion.

8. In a device of the class described, the combination of a spline shaft, a power member mounted for rotary movement about the axis of the shaft and provided with elements of a positive and a friction clutch,, a mounting member keyed to the shaft to turn therewith and having a limited axial movement thereon, a coacting friction clutch element carried by the mounting member and movable axially thereby into clutching engagement with its companion, camming means between the coacting friction clutch element and the axially shiftable mounting member for shifting the coacting friction element axially into engagement with its companion and a coacting slide member keyed to the mounting member to turn therewith and with the shaft and including a positive clutch element slidable axially into meshing engagement with its companion on the power member and a slip connection between the slide member and the mounting member operative to move the friction clutch initially into operative position engaging its companion and then permit the slide member to move the positive clutch into operative position.

9. In a device of the class described, the combination of a spline shaft, a power member mounted for rotary movement about the axis of the shaft and provided with elements of a positive and a friction clutch, a mounting member keyed to the shaft to turn therewith and having a limited axial movement thereon, a rigid coacting friction clutch element carried by the mounting member and movable thereby into an initial clutching engagement with its companion, camming means between the coacting friction clutch element and the axially movable mounting member for shifting the coacting friction element into engagement with its companion and a coacting slide member keyed to the mounting member to turn therewith and with the shaft and including a positive clutch element and slidable axially into meshing engagement with its companion on the power member.

10. In an automotive vehicle change speed transmission, the combination of an engine shaft, a propeller shaft means for positively driving one from the other, said means including a pair of positive clutch elements, a mounting member splined to one of the shafts and in intergeared driving relation with one of the positive clutch elements, a combined camming ring and friction clutch element carried by the mounting member and having a frictional clutching engagement with the other positive clutch element, and camming means comprising a cam element floatably mounted in the mounting member and a coacting cam element located in the combined camming ring and friction clutch element in spaced relation to its clutch surface and said camming means acting to shift the same into clutching engagement with its companion.

11. In a device of the class described, the combination of a member provided with an axially fixed element of a friction clutch, a mounting member shiftable axially relative to said clutch element, a coacting friction clutch element of fixed annular form carried by the mounting member and movable axially thereby into engagement with its companion and camming means between the mounting member and the coacting element bodily movable with the mounting member and operable by relative rotary movement in either direction between the mounting member and fixed clutch element for shifting the coacting element axially into a more intense clutching engagement.

12. In a device of the class described, the combination of the elements of a positive clutch mounted for rotary movement about a common axis, a friction clutch interposed between the elements of the positive clutch to rotate one with the other, camming means acting on the friction clutch to cause it to frictionally connect the positive clutch elements, said camming means actuated by the relative rotary movement between the elements of the positive clutch, both of the coacting elements of the camming means having both rotary and axial movement relative to said common axis and each of said coacting camming elements capable of rotary movement about a self-contained axis.

13. In a device of the class described, the combination of a member mounted for rotary movement and provided with an aperture extending axially therethrough, a pin mounted in said aperture and having one end pointed and projecting from one side of the member, and an element of a friction clutch provided with a conical aperture containing the pointed end of the pin and resilient means between the pin and clutch element for centering the pointed end of the pin in the conical aperture in the clutch element.

14. In a device of the class described, the combination of an element of a friction clutch mounted for rotary movement, a mounting member mounted for rotary movement, a coacting element of the friction clutch disposed between the mounting member and the first named friction clutch element and provided with a recess facing the mounting member, a camming member carried by the mounting member and having one end of conoidal or rounded form located in said recess and coacting to form camming means for shifting the coacting element into engagement with its companion incidental to any rotary movement between the coacting element and said mounting member and resilient means acting between the camming member and said mounting member tending to reseat the end of the camming member in said recess.

15. In a device of the class described, the combination of an element of a friction clutch mounted for rotary movement, a mounting member mounted for rotary movement, a coacting element of the friction clutch disposed between the mounting member and the first named friction clutch element and provided with a recess facing the mounting member, means carried by the mounting member and capable of movement relative thereto and having at one end a camming surface located in said recess and coacting to form camming means for shifting the coacting element into engagement with its companion incidental to any rotary movement between the coacting element and said mounting member, a stop facing the opposite end of said means and disposed for limiting the axial movement of the same in a direction away from the clutch.

16. In a device of the class described, the combination of an element of a friction clutch mounted for rotary movement, a mounting member mounted for rotary movement, a coacting element of the clutch disposed between the mounting member and the first named friction clutch element and provided with a recess facing the mounting member, a camming member carried by the mounting member movable relative thereto intruded into said recess and coacting to form camming means for shifting the coacting element into engagement with its companion incidental to any rotary movement between the coacting element and said mounting member and means for restoring the camming means to its normal inoperative position when free of torque imposed by said rotary movement and a stop for limiting the action of said restoring means.

17. In a device of the class described, the combination of a member mounted for rotary movement and provided with a camming pin mounted therein for limited axial sliding movement and provided at one end with a conical nose and at the opposite end with a head, a friction clutch including an element provided with a recess in which the conical nose is contained and a stop in the path of movement of the head for limiting the movement of the pin towards the same, and a spring between the pin and element tending to withdraw the head from the stop, to recenter the nose in the recess and to disconnect the coacting clutch from its companion.

18. In a device of the class described, the combination of a member mounted for rotary movement and provided with a camming pin mounted therein for limited axial sliding movement and provided at one end with a conical nose and at the opposite end with a head, a friction clutch including an element provided with a recess in which the conical nose is contained and a stop in the path of movement of the head for limiting the movement of the pin towards the same.

19. In a variable speed transmission mechanism, axially aligned driving and driven positive clutch elements, one of which is axially movable into and out of engagement with the other, a friction clutch element fixedly related to one positive clutch element, a coacting friction clutch element having a lost motion rotary driving connection relative to the other positive clutch element and camming means including both of its reactory camming surfaces movable axially with said other positive clutch element as it approaches and engages and said shiftable camming means means being controlled by said lost lost motion rotary movement between the coacting clutch element and the axially movable positive clutch element for shifting the second named friction clutch element axially in a direction towards the first named friction clutch element.

20. In a variable speed ratio transmission, the combination of two axially aligned power transmitting members, a jaw clutch element and a friction clutch element fixed to one of said members, a coacting floating friction clutch element, a slidable jaw clutch element driven from the other power transmitting member, a lost motion rotary driving connection between said floating clutch element and said slidable jaw clutch element, said driving connection comprising camming elements slidable axially in the slidable jaw clutch element and engaging in cam coacting spaces in the floating clutch element thereby permitting relative rotary movement between the cam elements carried by the slidable jaw clutch element and the floating friction clutch element, said cam elements reacting with the part of the floating clutch element outlining said spaces to force the floating friction clutch element firmly into engagement with its companion.

21. In a device of the class described, the combination of an axially fixed element of a friction clutch, a slidable unit including a mounting member provided with a splined bore adapted to engage the splines of a shaft and slidable axially thereon, a coacting clutch element journalled for a limited freedom of rotary movement on said mounting member and provided with a conical aperture offset from its inner periphery, means engaging the mounting member for shifting the coacting clutch element into an initial clutching engagement with the axially fixed element, a camming member carried by the mounting member, movable axially therewith and provided with an inclined surface engaging in said aperture, said friction clutch acting when its elements are initially engaged and when the clutch as a whole tends to rotate relative to the mounting member to cause relative circumferential movement between the coacting clutch element and the inclined surface of the camming member and said inclined surface of the camming member and coacting clutch element reacting to force the coacting clutch element more firmly into engagement with the axially fixed friction clutch element.

22. In a variable speed ratio transmission, the combination of two axially aligned power transmitting members, a jaw clutch element and a friction clutch element fixed to one of said members, a slidable unit including a coacting slidable jaw clutch element driven from the other power transmitting member, a floating friction clutch element movable into initial engagement with the first named friction clutch element by said slidable unit and camming means carried by the slidable unit and reacting on the floating clutch element when the clutch element rotates relative to the other part of the sliding unit for forcing the floating friction clutch element firmly into engagement with its companion, said camming means having a slight freedom of movement axially of said slidable unit and stop means for limiting the reactory movement of said camming means.

23. In a device of the class described, the combination of a spline shaft, two power members mounted in axially spaced apart relation for rotary movement about the axis of the shaft and otherwise fixed against axial movement, each member provided with a stop face, one facing the other and each provided with an element of a positive clutch and with an element of a friction clutch, a slidable unit including a coacting positive clutch element driven from the shaft, positioned between and adapted to move axially of the shaft to engage selectively either of said spaced positive clutch elements, a pair of combined camming and clutch floating elements positioned on opposite sides of said slidable unit and each provided with an element of a friction clutch coacting with the adjacent friction clutch element on the power members to form a friction clutch drive between the shaft and each of the power members, each of said floating elements provided with an element of a camming connection, a plurality of coacting elements of said camming connections slidably mounted for axial movement in said slidable unit and said camming connection operating when the slidable unit is moved towards one of the power members to move the floating element on its advance side into frictional clutching engagement with the associated friction clutch element incidental to relative rotary movement of the slidable element and the floating element, said coacting camming elements adapted to be shifted by said relative movement into abutment with the stop face of the power member in rear of the advacing slidable element to hold the coacting camming elements fixed against axial movement in one direction.

24. In a device of the class described, a friction clutch including an axially fixed and a movable element, said movable clutch element provided with an element of a cam actuated device for shifting the movable clutch element, a coacting element of said cam device having a slight freedom of movement in the direction which said clutch element moves when moving into its clutching position and a stop in the path of reverse movement of said coacting cam element to hold the same in position to cause the cam device to force the movable friction clutch element into engagement with the fixed clutch element.

25. In a transmission having a driving and a driven member, a positive clutch device axially movable to connect said members, a friction clutch device adapted to connect said members in advance of said positive clutch device, means operated by the initial part of the movement of the movable elements of the positive clutch device towards its companion to cause the elements of the frictional clutch device to engage with each other, camming means having all elements thereof movable axially by said initial movement of the positive clutch element into their operative camming position and acting incidental to any relative rotary movement between the elements of the friction device when engaged and said movable positive clutch element to force the friction clutch elements axially into a more forceful clutching engagement.

26. In a variable speed transmission mechanism, a shaft having two gears loose thereon, a jaw clutch element and a friction clutch element rigid with each gear, a slidable unit including a jaw clutch element mounted on the shaft between the gears and turning with the shaft, said slidable jaw clutch element adapted to be intermeshed selectively with either of the jaw clutch elements of the gears, a pair of floating friction clutch elements carried on opposite sides of and axially shiftable with the slidable unit into clutching engagement with the friction clutch element of the gear in advance of the sliding unit as it is moved in one or the other of its axial directions of movement, the axial distance between the friction clutch elements on the gears being greater than the corresponding distance between the friction clutch elements on the slide unit whereby when one friction clutch is in operation the other is disposed in an inoperative position and each of said floating friction clutch elements and the slide unit provided with interengaging camming elements operating when the engaged faces of one friction clutch tend to rotate relative to the slidable unit to force said engaged friction faces more firmly together in a direction axially of the shaft.

27. In a device of the class described, the combination of a shaft, a member loose on the shaft and provided with an element of a friction clutch, a slide unit splined to the shaft, a coacting element of the friction clutch moved by the slide unit into an initial frictional engagement with the element on the loose member when the slide unit is moved in the direction towards the loose member, said coacting element provided with a recess having inclined sides symmetrical with reference to a line extending axially of the shaft, a camming member carried by the slide unit and having a correspondingly inclined part fitted in the recess and coacting therewith to force the coacting element axially into a more intense clutching condition whenever the coacting member in its engagement with the loose member tends to turn relative to the shift unit and means carried by the shift unit and operated by the movement of the shift unit in the opposite direction for shifting the coacting clutch element into its unclutched, inoperative position.

28. In a device of the class described, the combination of a shaft, a friction clutch element loose on the shaft, a slide member splined to the shaft, a coacting friction clutch element on the side of the slide member facing its companion and movable axially into engagement therewith as the member slides towards the same, a double-acting camming member carried by and projecting from said side of the slide member, engaging in a camming recess in the adjacent side of the coacting clutch element and acting whenever the engaged clutch element tends to rotate the coacting element in either rotative direction relative to the slide member to force the clutch elements more firmly into clutching engagement in a direction axially of the shaft.

29. In a device of the class described, the combination of a shaft, a friction clutch element loose on the shaft, a slide member splined to the shaft, a coacting friction clutch element on the side of the slide member facing its companion and movable into engagement therewith as the member slides towards the same, a camming member carried by and projecting from said side of the slide member, engaging in a camming recess in the adjacent side of the coacting clutch element and acting whenever the engaged clutch element tends to rotate the coacting element relative to the slide member to force the clutch elements more firmly into clutching engagement, and a spring reacting between the coacting clutch element and the camming member tending to draw them together and to cause the camming member to react on the coacting clutch element at the recess to center the camming member in the recess.

30. In a device of the class described, the combination of a friction clutch element, a coacting element both elements comprising endless rings one telescoping the other, floating camming means for forcing the elements together into clutching position, manually actuated means for simultaneously moving both of the coacting elements of the camming means to and from the first named friction clutch element into an operative position and for causing an initial engagement of the friction elements, said camming means operable automatically as an incident of any relative movement between the coacting clutch element and said manually actuated means.

31. In a device of the class described, the combination of an axially fixed clutch element, a slide unit, an endless ring constituting a clutch element secured to the slide unit to move axially therewith and movably thereby into and away from its clutching engagement with the axially fixed element, said coacting element having a limited freedom of rotary movement relative to the slide unit and camming means between the slide unit and coacting element operatively responsive to relative rotary movement between the coacting element and the slide unit when the clutch elements are engaged for increasing the pressure of the coacting member in its axially directed engagement with the fixed clutch element and said camming means acting as a stop for limiting the freedom of rotary movement between the endless ring and the slide unit.

32. In a device of the class described, the combination of a shaft, a friction clutch element mounted for rotary movement about the axis of the shaft, a member splined to the shaft and slidable thereon, a coacting clutch element shiftable by said member to and from its clutching engagement with its companion, said shift member provided with a bore extending therethrough, and said coacting clutch element provided with a recess normally disposed in line with said bore, camming means mounted in said bore having a limited freedom of movement therein and engaging at one end in said recess to cause the coacting element to turn with the shaft and acting to force the clutch elements together on relative rotary movement between the coacting element and the slide member and stop means at the opposite end of the camming means for limiting the movement of said means in the direction away from the coacting clutch element and thus holding the camming means in operative position.

33. In a variable speed transmission mechanism, a shaft having two power members loose thereon and each provided with a stop face disposed axially opposite each other, a positive clutch element and a friction clutch element rigid with each member, a slide unit mounted on the shaft, between the power members, and provided with a positive clutch element, said slidable positive clutch element turning with the shaft and adapted to be intermeshed selectively with either of the positive clutch elements of the power members, a pair of floating friction clutch elements carried on opposite sides of the slidable unit, axially shiftable therewith and adapted to be moved thereby into clutching engagement with the friction clutch element in advance of the sliding unit, said sliding unit provided with an axially extending bore, said friction clutch elements each provided with an opening facing opposite ends of said bore and a camming device slidable in said bore and having opposite ends disposed to extend through the openings, said camming device substantially fitting between said two stop faces and the part of the camming device disposed in said openings being inclined to the axis of the bore and coacting with the floating friction elements to force the same into engagement with their companions incidental to relative rotary movement between said floating friction elements and the shift unit.

34. In a variable speed transmission mechanism, a shaft having two power members loose thereon and each provided with a stop face disposed axially opposite each other, a positive clutch element and a friction clutch element rigid with each member, a slide unit mounted on the shaft, between the power members, and provided with a positive clutch element, said positive clutch element turning with the shaft and adapted to be intermeshed selectively with either of the positive clutch elements of the power members, a pair of floating friction clutch elements carried on opposite sides of the slidable unit, axially shiftable therewith and adapted to be moved thereby into clutching engagement with the friction clutch element in advance of the sliding unit, said floating elements provided with opposing openings extending therethrough, camming means revolvable with the slide unit and substantially fitting between the stop faces, said camming means provided at the parts thereof extending through the openings with conoidal surfaces coacting with the openings to more firmly force each floating element into engagement with its companion on the power member whenever the engaged friction elements turn relative to the slide unit.

35. In a device of the class described, the combination of a shaft, a pair of friction clutch elements mounted for rotary movement about the axis of the shaft and forming axially fixed stops, a slide member positioned between said pair of fixed elements, turning with the shaft and provided with two clutch elements coacting with the fixed elements to form two friction clutches, and a single pressure means operatively responsive to a rotary movement about the shaft of either of the friction clutches when its elements are engaged and reacting against the stop provided by the fixed element of the other friction clutch to force the engaged elements more firmly into their clutched position.

36. In a synchronizing device, the combination of a positive clutch, synchronizing means for causing the elements of the positive clutch to approach the same speed before being moved into interengagement, said means comprising the elements of a friction clutch including an axially movable element mounted for rotary movement about an axis and an axially fixed stop, mechanism disposed between the stop and the movable element and provided with means operatively controlled by the rotary movement of the movable element to force the same into engagement with its companion.

HOWARD J. MURRAY.